US009399273B2

United States Patent
Hoshino (10) Patent No.: US 9,399,273 B2
(45) Date of Patent: Jul. 26, 2016

(54) CUTTING FLUID CONTROL DEVICE FOR MACHINE TOOL

(71) Applicant: FANUC Corporation, Yamanashi (JP)

(72) Inventor: Yoshinori Hoshino, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 260 days.

(21) Appl. No.: 14/210,279

(22) Filed: Mar. 13, 2014

(65) Prior Publication Data

US 2014/0271002 A1 Sep. 18, 2014

(30) Foreign Application Priority Data

Mar. 15, 2013 (JP) ................................ 2013-053484

(51) Int. Cl.
*B23Q 11/10* (2006.01)
(52) U.S. Cl.
CPC ............ *B23Q 11/10* (2013.01); *B23Q 11/1061* (2013.01); *Y10T 408/44* (2015.01); *Y10T 409/303976* (2015.01)
(58) Field of Classification Search
CPC ............... B23Q 11/10; B23Q 11/1061; Y10T 409/303976; Y10T 408/44
See application file for complete search history.

(56) References Cited

U.S. PATENT DOCUMENTS

| 5,265,505 | A | * | 11/1993 | Frechette | B23Q 1/0018 29/39 |
| 5,389,546 | A | * | 2/1995 | Becket | G01N 31/164 422/75 |
| 5,565,120 | A | * | 10/1996 | La Rocca | B23K 26/123 219/121.67 |
| 5,850,654 | A | * | 12/1998 | Coffey | A01K 61/003 15/1.7 |
| 6,110,386 | A | * | 8/2000 | Underhill | B01D 17/0202 210/167.02 |
| 6,435,198 | B2 | * | 8/2002 | Berger | 134/104.2 |
| 6,915,679 | B2 | * | 7/2005 | Chien | B01L 3/502715 422/50 |
| 7,410,569 | B1 | * | 8/2008 | Tilev | B01D 21/0012 210/167.02 |
| 8,361,313 | B2 | * | 1/2013 | Pancaldi | B01D 29/111 210/106 |
| 8,597,461 | B2 | * | 12/2013 | Mayer | C23F 1/08 156/345.15 |
| 8,933,003 | B2 | * | 1/2015 | Shibata | B23H 1/08 208/18 |

(Continued)

FOREIGN PATENT DOCUMENTS

| JP | 5-16112 U | 3/1993 |
| JP | 647649 A | 2/1994 |

(Continued)

OTHER PUBLICATIONS

Office Action mailed Jun. 24, 2014, corresponds to Japanese patent application No. 2013-053484.

(Continued)

*Primary Examiner* — Ramesh Patel
(74) *Attorney, Agent, or Firm* — Hauptman Ham, LLP (57) ABSTRACT

A cutting fluid control device for a machine tool is used to adjust the amounts of supply of a cutting fluid and water, thereby controlling the concentration of the cutting fluid in a cutting fluid tank, and comprises an operating unit which inputs a machining condition of the machine tool, a computing unit which calculates the concentration of the cutting fluid based on the machining condition input through the operating unit, and an adjustment unit which adjusts the amounts of supply from a cutting fluid undiluted-solution supply device and a water supply device so that the concentration of the cutting fluid in the cutting fluid tank is equal to the cutting fluid concentration calculated by the computing unit.

3 Claims, 5 Drawing Sheets

(56) References Cited

U.S. PATENT DOCUMENTS

| | | | | |
|---|---|---|---|---|
| 2003/0085077 | A1* | 5/2003 | Ihara | B01D 17/0208 184/6.21 |
| 2004/0242435 | A1* | 12/2004 | Nishimura | C10M 173/02 508/291 |
| 2009/0111723 | A1* | 4/2009 | Shibata | B23H 1/08 508/463 |

FOREIGN PATENT DOCUMENTS

| | | |
|---|---|---|
| JP | 6-75638 U | 10/1994 |
| JP | 7-179880 A | 7/1995 |
| JP | 8-257871 A | 10/1996 |
| JP | 985577 A | 3/1997 |
| JP | 2000-073084 A | 3/2000 |
| JP | 2010-188480 A | 9/2010 |
| JP | 2010188480 A | 9/2010 |

OTHER PUBLICATIONS

Office Action dated Jul. 30, 2015, corresponding to Chinese patent application No. 201410095117.2.

* cited by examiner

<NOTES>
(1) ALUMINUM, EDGE TEMPERATURE AT 200-250°C
(2) CARBON STEEL, EDGE TEMPERATURE AT 500-600°C
(3) SUS, EDGE TEMPERATURE AT 650-750°C

WATER-INSOLUBLE CUTTING FLUID⇒NO DILUTION NEEDED⇒CUTTING FLUID CONCENTRATION OF 100%

WATER-SOLUBLE CUTTING FLUID

| CONTENT OF MACHINING | MATERIAL OF WORKPIECE | MATERIAL OF CUTTING TOOL | CUTTING FLUID CONCENTRATION |
|---|---|---|---|
| HEAVY-DUTY CUTTING | ALUMINUM | HIGH-SPEED TOOL STEEL | 10% |
| | | CARBIDE TOOL | WARNING |
| | CARBON STEEL | HIGH-SPEED TOOL STEEL | WARNING |
| | | CARBIDE TOOL | 13% |
| | SUS | HIGH-SPEED TOOL STEEL | WARNING |
| | | CARBIDE TOOL | 15% |
| CUTTING | ALUMINUM | HIGH-SPEED TOOL STEEL | 5% |
| | | CARBIDE TOOL | WARNING |
| | CARBON STEEL | HIGH-SPEED TOOL STEEL | WARNING |
| | | CARBIDE TOOL | 10% |
| | SUS | HIGH-SPEED TOOL STEEL | WARNING |
| | | CARBIDE TOOL | 12% |
| GRINDING | ALUMINUM | HIGH-SPEED TOOL STEEL | 5% |
| | | CARBIDE TOOL | WARNING |
| | CARBON STEEL | HIGH-SPEED TOOL STEEL | 6% |
| | | CARBIDE TOOL | WARNING |
| | SUS | HIGH-SPEED TOOL STEEL | WARNING |
| | | CARBIDE TOOL | 8% |

※ WARNING IS ISSUED IF WORKPIECE AND CUTTING TOOL ARE ILL-MATCHED

CUTTING FLUID CONTROL DEVICE FOR MACHINE TOOL

RELATED APPLICATIONS

The present application claims priority to Japanese Application Number 2013-053484, filed Mar. 15, 2013, the disclosure of which is hereby incorporated by reference herein in its entirety.

BACKGROUND OF THE INVENTION

1. Field of the Invention

The present invention relates to a cutting fluid control device for a machine tool, and more particularly, to a cutting fluid control device for a machine tool capable of calculating an optimal concentration of a cutting fluid according to machining conditions (workpiece material, cutting tool type, etc.) without relying on expert knowledge.

2. Description of the Related Art

A machine, such as a machine tool, is supplied with a water-soluble or water-insoluble cutting fluid during machining. The cutting fluid is stored in a cutting fluid tank and supplied to the machine side by a cutting fluid supply pump connected to the cutting fluid tank. When used, the cutting fluid adheres to a workpiece and is removed to the outside of the machine. Then, the used cutting fluid flows around the machine inside a guard cover, and is returned to the cutting fluid tank through a cutting fluid return path and recycled. While there are various cutting fluids with various properties, their concentrations and amounts should be controlled.

(1) Japanese Utility Model Application Laid-Open No. 5-16112 discloses a concentration meter and an oil level gauge in engagement with a cutting oil tank, time measuring means for measuring actual working hours, and a controller configured to automatically supply crude oil and clean water to the cutting oil tank based on the measured values. According to this arrangement, the concentration and amount of oil in the cutting oil tank can always be kept at a predetermined value, whereby the oil can be normalized and the machining accuracy can be stabilized. By this technique, the oil in the cutting oil tank can be decontaminated so that its life is increased and the machining accuracy is improved.

(2) Japanese Patent Application Laid-Open No. 2010-188480 discloses a machine tool and a coolant monitoring system therefor, capable of preventing various adverse influences of degradation of a liquid coolant. In this method, the quality of the liquid coolant used for cooling during cutting a workpiece or cleaning during tool replacement is detected by means of a pH sensor, water quality/hardness sensor, and concentration sensor. A detection value of each of the sensors is compared with a threshold. If the detection value is within a normal range, an indication of its normality is displayed on the screen of a display device. If the detection value is in a cautionary range, a warning is displayed on the display screen. If the detection value is in an abnormal range, cutting by the machine body is prohibited.

(3) Japanese Utility Model Application Laid-Open No. 6-75638 discloses an automated quality control of prevention of decay and concentration control of water-soluble cutting oil used in a machine tool or the like, which is intended to save the cost of the maintenance by keeping the life of cutting fluid long and improve the tool life and product quality by adjusting the concentration of the cutting fluid optimally. To attain this, the water-soluble oil in a tank is drawn up by a pump and extraneous matter is removed by a suction filter and a line filter. Then, the oil is heated and increased in temperature to be sterilized by a heater and then passed through a concentration sensor. Thereupon, the liquid concentration is measured by the concentration sensor, and a flow control valve is actuated in response to a command from the controller based on the rate of the measured liquid concentration. In this way, the inflow rate of an undiluted solution of the cutting oil from an undiluted solution pump or dilution water from a water pump is adjusted so that the cutting fluid with a constant concentration can be returned to the cutting oil tank. The cutting oil thus returned to the tank is supplied to the machine tool by the pump.

(4) Japanese Patent Application Laid-Open No. 7-179880 discloses a decay prevention method for cutting oil used in a machine tool, wherein water-soluble cutting oil is supplied to the machine tool by a cutting fluid supply device which includes a reservoir, pump, cutting oil supply pipe, cutting oil reservoir, cutting fluid discharge pipe, etc., in order to reliably kill microorganisms in the cutting oil, especially anaerobic bacteria, which directly cause generation of unpleasant odors, or suppress their growth without damaging the quality or properties of the cutting oil. The reservoir is supplied with air by an air supplier and aerated. A part of the cutting oil is batched off from the reservoir, and suspended matter is separated and removed by a solid-liquid separator. The resulting clean cutting oil is supplied to an adjustment tank, in which its temperature and hydrogen-ion concentration (pH) are adjusted so that the activity of the microorganisms is reduced. Thereafter, the cutting oil is pressurized to a predetermined pressure by a booster, intermittently delivered to a pressurization device, and kept at the predetermined pressure for a predetermined time.

(5) Japanese Patent Application Laid-Open No. 2000-73084 discloses a cutting oil treatment apparatus for a machine tool, capable of maintaining the performance of water-soluble cutting oil, which may be degraded after prolonged use, at the same level as that of fresh one without producing waste. This cutting oil treatment apparatus collects a part of the water-soluble cutting oil stored in a main cutting oil tank attached to the machine tool into another tank. Then, the treatment apparatus decomposes putrefactive bacteria, additives, etc., in the water-soluble cutting oil with microorganisms, catalyst, etc., for waste treatment and returns the oil to the afore-mentioned another tank. After this decomposition treatment is carried out a predetermined number of times, an undiluted solution of the cutting oil is added to the treated oil returned to the second tank, and fresh water-soluble cutting oil is prepared by dilution to a certain concentration and returned to the main cutting oil tank. The performance of the water-soluble cutting oil in the main cutting oil tank is kept constant by sequentially repeating this operation.

The concentration of the cutting fluid has an optimal value depending on the workpiece material, cutting tool type, etc. Although the predetermined concentration, amount of oil, and time are regulated in the prior art techniques (1), (2) and (3) described above, there is no description of, for example, how to determine the cutting fluid concentration in accordance with the workpiece material, cutting tool type, etc. In general, setting the cutting fluid concentration greatly depends on experts' experiences and varies depending on the operator. Further, the prior art techniques (4) and (5) are not intended to obtain an optimal concentration.

SUMMARY OF THE INVENTION

Accordingly, in view of the problems of the prior art described above, the object of the present invention is to provide a cutting fluid control device for a machine tool, capable of calculating an optimal concentration of a cutting fluid according to machining conditions (workpiece material, cutting tool type, etc.) without relying on expert knowledge.

A cutting fluid control device for a machine tool according to the present invention comprises a cutting fluid undiluted-solution supply device configured to supply an undiluted solution of a cutting fluid to a cutting fluid tank, a water supply device configured to supply water for diluting the cutting fluid undiluted-solution in the cutting fluid tank, and a concentration sensor configured to detect the concentration of the cutting fluid in the cutting fluid tank, and adjusts the amounts of supply of the cutting fluid and the water to control the concentration of the cutting fluid in the cutting fluid tank. The cutting fluid control device further comprises an operating unit configured to input a machining condition of the machine tool, a computing unit configured to calculate the concentration of the cutting fluid based on the machining condition input through the operating unit, and an adjustment unit configured to adjust the amounts of supply from the cutting fluid undiluted-solution supply device and the water supply device so that the concentration of the cutting fluid in the cutting fluid tank is equal to the cutting fluid concentration calculated by the computing unit.

The machining condition may be one or a combination of items including the material of a workpiece, the content of machining, and the type of a cutting tool used.

The computing unit may be configured so as to read the concentration of the cutting fluid corresponding to the machining condition input to the operating unit from a storage unit in which the concentration of the cutting fluid correlated with the machining condition is stored.

According to the present invention, the concentration of the cutting fluid can be automatically adjusted and controlled according to the machining condition, and the viscosity of the cutting fluid can be increased to improve lubricity between the cutting tool and the workpiece, thereby increasing the cutting speed.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

One embodiment of a cutting fluid control device for a machine tool according to the present invention will be described with reference to FIG. 1.

The cutting fluid control device for a machine tool comprises a controller 1 with a display device 2, a concentration sensor 3 for measuring the concentration of a cutting fluid, and a fluid level sensor 4 for measuring the volume of cutting fluid. A cutting fluid tank 5 that stores the cutting fluid comprises a clean water tank 7, which stores the cutting fluid decontaminated by a filter 6, and a sewage tank 8. The sewage tank 8 of the cutting fluid tank 5 is supplied with an undiluted solution of the cutting fluid from a cutting fluid undiluted-solution supply device 9 and water through a water supply device 10.

The cutting fluid that has become unnecessary is collected as a waste fluid 13 in a waste tank 12 by opening a discharge valve 11 attached to a lower part of the sewage tank 8. The concentration sensor 3 measures the concentration of the cutting fluid in the clean water tank 7. To measure the cutting fluid volume, the fluid level sensor 4 measures the surface level of the cutting fluid in the clean water tank 7.

A workpiece 18 placed on a table 17 is machined by a tool 20 mounted on a spindle 19 of the machine tool. A pump (coolant pump) 14 is used to draw up the cutting fluid stored in the clean water tank 7 and discharge it from a nozzle (coolant nozzle) 16 toward the workpiece 18 through a duct 15. The cutting fluid discharged toward the workpiece 18 is collected in the sewage tank 8 of the cutting fluid tank 5 through a duct (not shown). The collected cutting fluid is decontaminated by the filter 6 and supplied to the clean water tank 7 to be recycled.

The controller 1 receives a level detection signal detected by the fluid level sensor 4 and a concentration detection signal detected by the concentration sensor 3. Further, the controller 1 drives the coolant pump 14 to draw up the cutting fluid from the clean water tank 7 and discharge it from the nozzle 16 toward the workpiece 18. The controller 1 is provided with a software (program) that performs the processing shown in the flowcharts of FIGS. 2 to 5. By executing this software, the controller 1 controls the cutting fluid undiluted-solution supply device 9 and the water supply device 10 so that the concentration of the cutting fluid in the cutting fluid tank is kept at an optimal value, based on information from the concentration sensor 3 and the fluid level sensor 4. In this way, the supply quantities of the cutting fluid undiluted-solution and water are adjusted. The discharge valve 11 is also controlled by the controller 1 so that the cutting fluid in the cutting fluid tank 5 can be discarded as the waste fluid 13 into the waste tank 12 if it becomes unsuitable for the machining of the workpiece 18.

Figure 1:
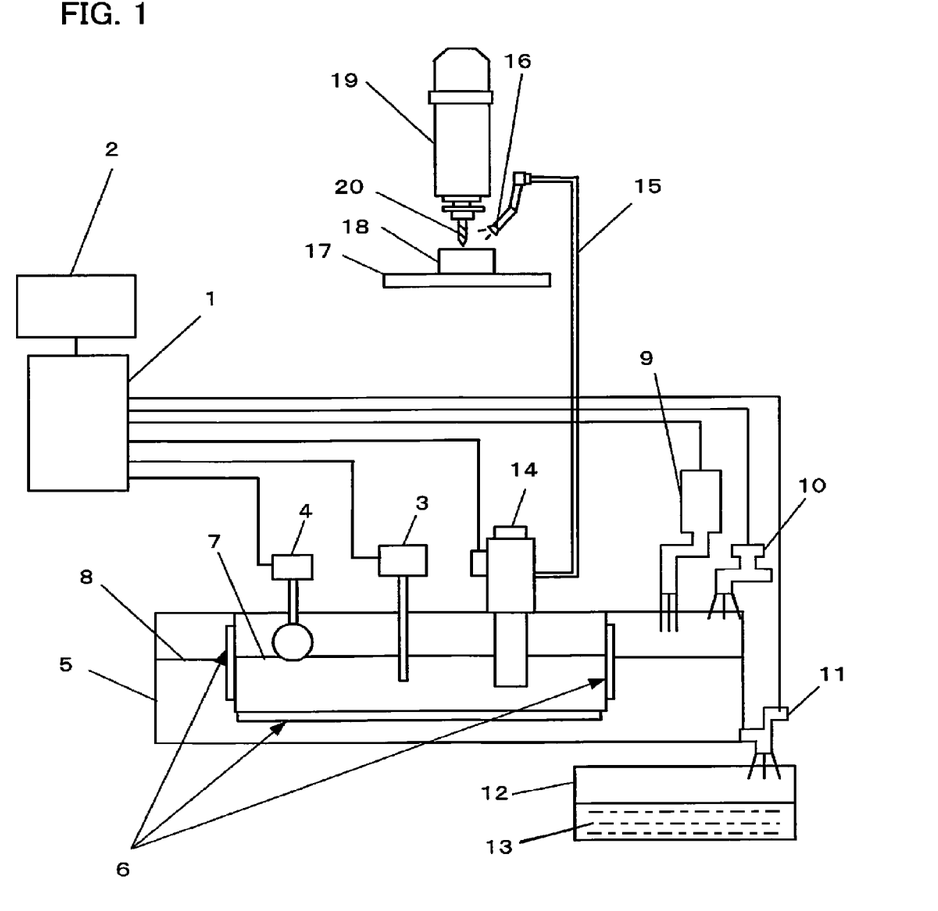
FIG. 1 is a block diagram illustrating one embodiment of a cutting fluid control device for a machine tool according to the present invention.
Figure 2:
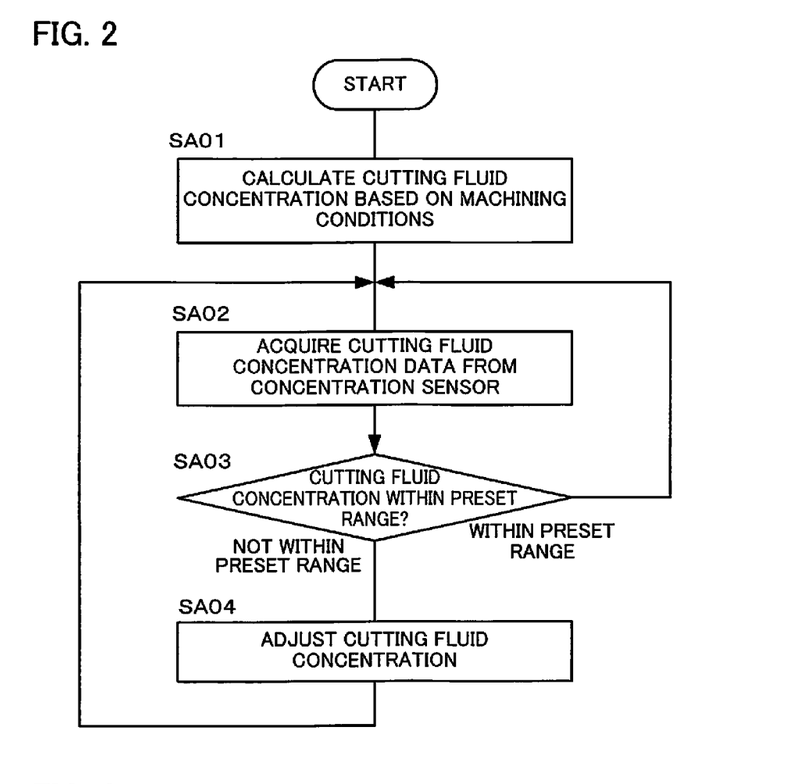
FIG. 2 is a flowchart illustrating processing performed by the cutting fluid control device of FIG. 1 to calculate the concentration of a cutting fluid based on machining conditions.

FIG. 2 is a flowchart illustrating processing performed by the cutting fluid control device of FIG. 1 to calculate the concentration of the cutting fluid based on machining conditions. The following is a sequential description of various steps of operation.

[Step SA01] The concentration of the cutting fluid is calculated based on machining conditions. The machining conditions are described and specified in a machining program or input through input means (control panel, not shown) of the controller 1 by an operator.

[Step SA02] Concentration data on the cutting fluid is acquired from the concentration sensor.

[Step SA03] The concentration of the cutting fluid is compared with a predetermined threshold. If the concentration of the cutting fluid is within a preset range, the program returns to Step SA02. If not, the program proceeds to Step SA04.

[Step SA04] The concentration of the cutting fluid is adjusted. Specifically, the amounts of supply to the cutting fluid tank from the cutting fluid undiluted-solution supply device 9 and the water supply device 10 are adjusted, whereupon the program returns to Step SA02.

Figure 3:
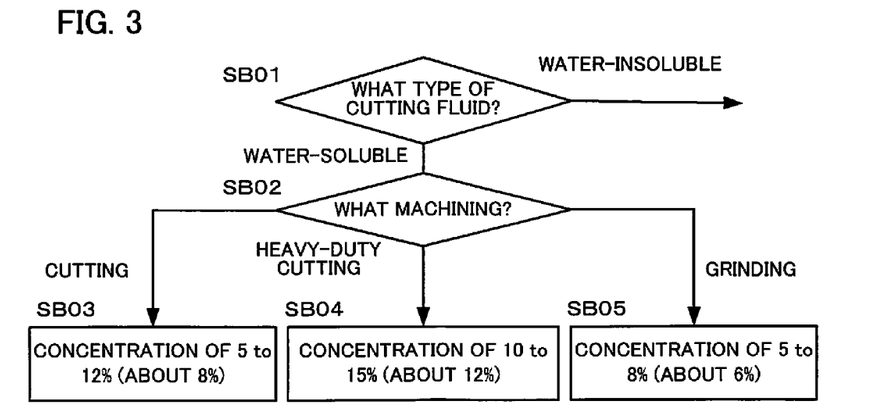
FIG. 3 is a flowchart illustrating processing performed by the cutting fluid control device of FIG. 1 to calculate the concentration of the cutting fluid based on the content of machining.

(1) A case where the concentration of the cutting fluid is set (or calculated) depending on the content of machining, at Step SA01 in the flowchart of FIG. 2, will be described with reference to the flowchart of FIG. 3. The following is a sequential description of various steps of operation.

[Step SB01] The type of the cutting fluid is determined. If the cutting fluid is water-insoluble, this processing ends, as the cutting fluid need not be diluted. If the cutting fluid is water-soluble, the program proceeds to Step SB02.

[Step SB02] The content of machining is determined. If the machining is cutting, the program proceeds to Step SB03. If the machining is heavy-duty cutting, the program proceeds to Step SB04. If the machining is grinding, the program proceeds to Step SB05.

[Step SB03] The concentration of the cutting fluid is set to 5 to 120 (optimally to about 80).

[Step SB04] The concentration of the cutting fluid is set to 10 to 150 (optimally to about 120).

[Step SB05] The concentration of the cutting fluid is set to 5 to 80 (optimally to about 60).

The processing shown in the flowchart of FIG. 2 is processing for selecting optimal dilution concentrations of Syntilo 9918, a type of the cutting fluid, for cutting (cutting fluid concentration of 5 to 120), heavy-duty cutting (cutting fluid concentration of 10 to 150), grinding (cutting fluid concentration of 5 to 80), etc. The distribution of the cutting fluid undiluted-solution and water is adjusted based on the dilution concentration.

Figure 4:
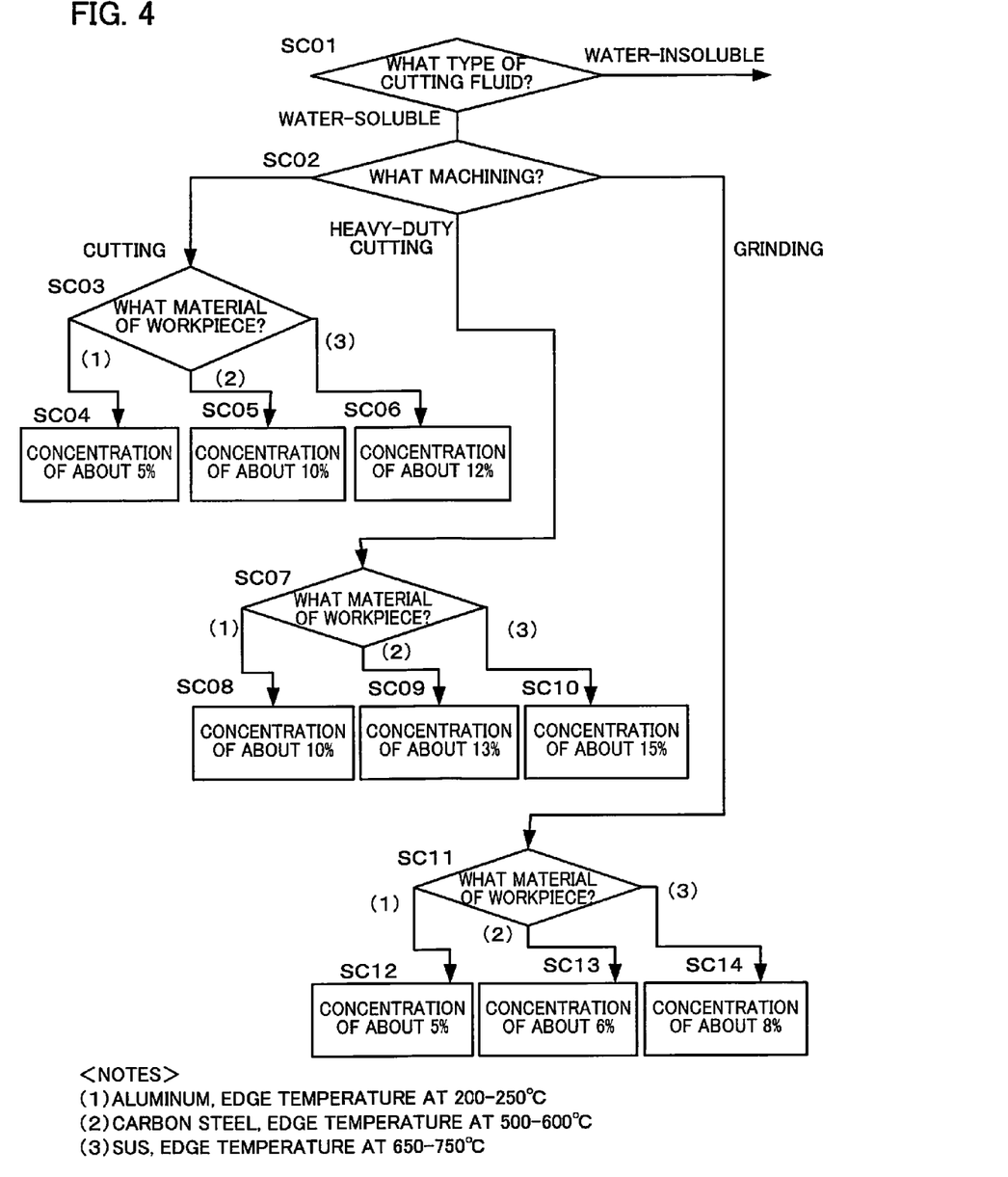
FIG. 4 is a flowchart illustrating processing performed by the cutting fluid control device of FIG. 1 to calculate the concentration of the cutting fluid based on the content of machining and the material of a workpiece.

(2) A case where the concentration of the cutting fluid is set (or calculated) depending on the content of machining and the material of the workpiece, at Step SA01 in the flowchart of FIG. 2, will be described with reference to the flowchart of FIG. 4. The following is a sequential description of various steps of operation.

[Step SC01] The type of the cutting fluid is determined. If the cutting fluid is water-insoluble, this processing ends, as the cutting fluid need not be diluted. If the cutting fluid is water-soluble, the program proceeds to Step SC02.

[Step SC02] The content of machining is determined. If the machining is cutting, the program proceeds to Step SC03. If the machining is heavy-duty cutting, the program proceeds to Step SC07. If the machining is grinding, the program proceeds to Step SC11.

[Step SC03] If the material of the workpiece is aluminum and if the cutting edge temperature ranges from 200 to 250° C., the program proceeds to Step SC04. If the workpiece material is carbon steel and if the edge temperature ranges from 500 to 600° C., the program proceeds to Step SC05. If the workpiece material is SUS and if the edge temperature ranges from 650 to 750° C., the program proceeds to Step SC06.

[Step SC04] The concentration of the cutting fluid is set to about 5%.

[Step SC05] The concentration of the cutting fluid is set to about 10%.

[Step SC06] The concentration of the cutting fluid is set to about 12%.

[Step SC07] If the material of the workpiece is aluminum and if the cutting edge temperature ranges from 200 to 250° C., the program proceeds to Step SC08.

If the workpiece material is carbon steel and if the edge temperature ranges from 500 to 600° C., the program proceeds to Step SC09. If the workpiece material is SUS and if the edge temperature ranges from 650 to 750° C., the program proceeds to Step SC10.

[Step SC08] The concentration of the cutting fluid is set to about 10%.

[Step SC09] The concentration of the cutting fluid is set to about 13%.

[Step SC10] The concentration of the cutting fluid is set to about 15%.

[Step SC11] If the material of the workpiece is aluminum and if the cutting edge temperature ranges from 200 to 250° C., the program proceeds to Step SC12. If the workpiece material is carbon steel and if the edge temperature ranges from 500 to 600° C., the program proceeds to Step SC13. If the workpiece material is SUS and if the edge temperature ranges from 650 to 750° C., the program proceeds to Step SC14.

[Step SC12] The concentration of the cutting fluid is set to about 5%.

[Step SC13] The concentration of the cutting fluid is set to about 6%.

[Step SC14] The concentration of the cutting fluid is set to about 8%.

Figure 5:
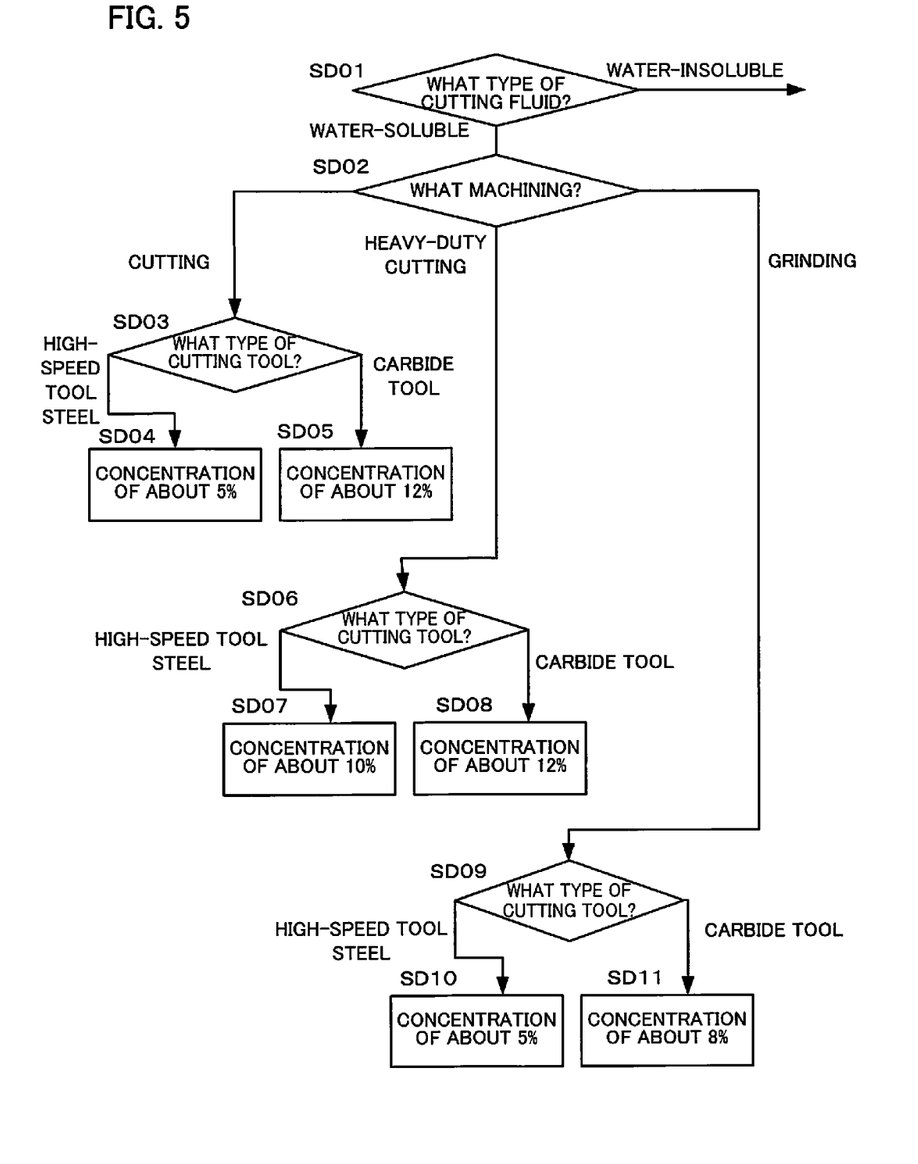
FIG. 5 is a flowchart illustrating processing performed by the cutting fluid control device of FIG. 1 to calculate the concentration of the cutting fluid based on the content of machining and the type of a cutting tool.

(3) A case where the concentration of the cutting fluid is set (or calculated) depending on the content of machining and the type of a cutting tool, at Step SA01 in the flowchart of FIG. 2, will be described with reference to the flowchart of FIG. 5. The following is a sequential description of various steps of operation.

[Step SD01] The type of the cutting fluid is determined. If the cutting fluid is water-insoluble, this processing ends, as the cutting fluid need not be diluted. If the cutting fluid is water-soluble, the program proceeds to Step SD02.

[Step SD02] The content of machining is determined. If the machining is cutting, the program proceeds to Step SD03. If the machining is heavy-duty cutting, the program proceeds to Step SD06. If the machining is grinding, the program proceeds to Step SD09.

[Step SD03] The type of the cutting tool is determined. If the cutting tool is made of high-speed tool steel, the program proceeds to Step SD04. If the cutting tool is a carbide tool, the program proceeds to Step SD05.

[Step SD04] The concentration of the cutting fluid is set to about 5%.

[Step SD05] The concentration of the cutting fluid is set to about 12%.

[Step SD06] The type of the cutting tool is determined. If the cutting tool is made of high-speed tool steel, the program proceeds to Step SD07. If the cutting tool is a carbide tool, the program proceeds to Step SD08.

[Step SD07] The concentration of the cutting fluid is set to about 10%.

[Step SD08] The concentration of the cutting fluid is set to about 12%.

[Step SD09] The type of the cutting tool is determined. If the cutting tool is made of high-speed tool steel, the program proceeds to Step SD10. If the cutting tool is a carbide tool, the program proceeds to Step SD11.

[Step SD10] The concentration of the cutting fluid is set to about 5%.

[Step SD11] The concentration of the cutting fluid is set to about 8%.

Figure 6:
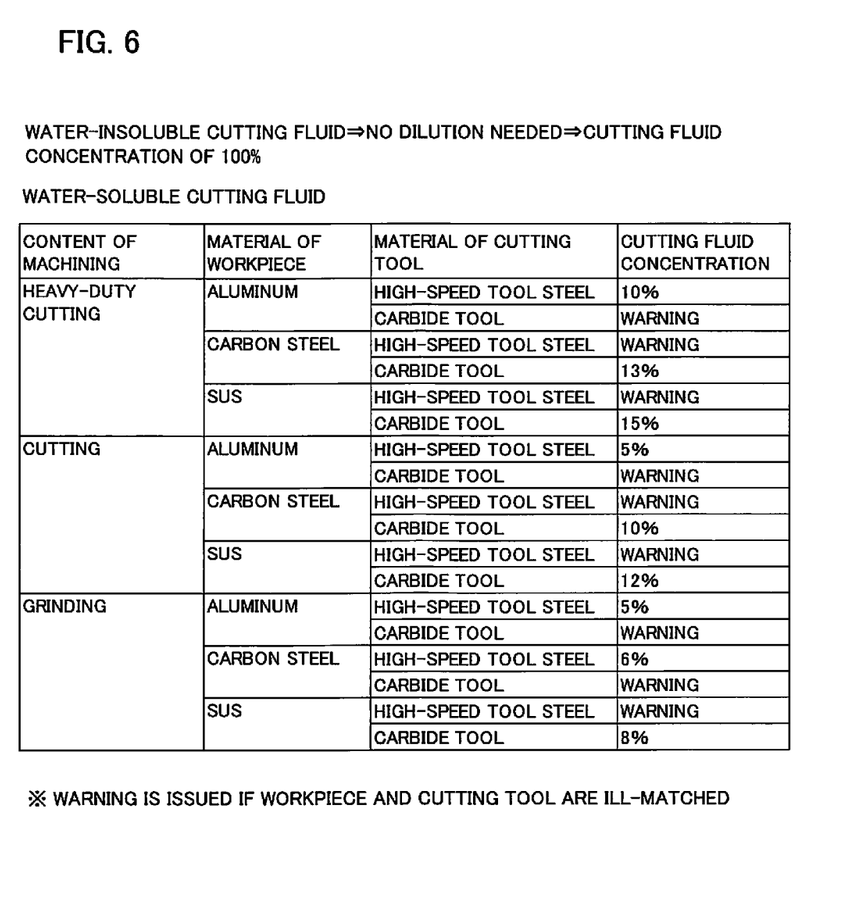
FIG. 6 is a diagram illustrating a table in which concentrations of the cutting fluid are compared with the machining conditions.

FIG. 6 is a diagram illustrating a table in which concentrations of the cutting fluid are compared with the machining conditions. The concentrations of the cutting fluid corresponding to the content of machining and the materials of the workpiece and the cutting tool are previously stored as table data in a memory (not shown) attached to the controller 1. In the processing shown in the foregoing flowchart, a concentration of the cutting fluid corresponding to the content of machining and the materials of the workpiece and the cutting tool is read from the memory, and the read concentration are compared with the cutting fluid concentration detected by the concentration sensor.

An operator can input data, such as materials of the workpiece (e.g., aluminum, casting, resin, etc.), types of the cutting tool (e.g., an end mill, drill, tap, etc., of carbide tool or high-speed tool steel), and contents of machining (e.g., cutting, heavy-duty cutting, grinding, etc.), through a control panel of the controller 1. If the workpiece and the cutting tool are ill-matched, a warning may be issued.

By the cutting fluid control device for a machine tool of the present invention, the concentration of the cutting fluid can be automatically adjusted and controlled according to the machining conditions, and the viscosity of the cutting fluid can be increased to improve lubricity between the cutting tool and the workpiece, thereby increasing the cutting speed.

The invention claimed is:

1. A cutting fluid control device for a machine tool, which comprises:
   a cutting fluid undiluted-solution supply device configured to supply an undiluted solution of a cutting fluid to a cutting fluid tank;
   a water supply device configured to supply water for diluting the cutting fluid undiluted-solution in the cutting fluid tank; and
   a concentration sensor configured to detect the concentration of the cutting fluid in the cutting fluid tank, wherein the cutting fluid control device adjusts the amounts of supply of the cutting fluid and the water to control the concentration of the cutting fluid in the cutting fluid tank, the cutting fluid control device further comprising:
   an operating unit configured to input a machining condition of the machine tool;
   a computing unit configured to calculate the concentration of the cutting fluid based on the machining condition input through the operating unit; and
   an adjustment unit configured to adjust the amounts of supply from the cutting fluid undiluted-solution supply device and the water supply device so that the concentration of the cutting fluid in the cutting fluid tank is equal to the cutting fluid concentration calculated by the computing unit.

2. The cutting fluid control device for a machine tool according to claim 1, wherein the machining condition is one or a combination of items including the material of a workpiece, the content of machining, and the type of a cutting tool used.

3. The cutting fluid control device for a machine tool according to claim 1, wherein the computing unit is configured so as to read the concentration of the cutting fluid corresponding to the machining condition input to the operating unit from a storage unit in which the concentration of the cutting fluid correlated with the machining condition is stored.

* * * * *